(12) United States Patent
Ladouceur et al.

(10) Patent No.: US 7,911,450 B2
(45) Date of Patent: Mar. 22, 2011

(54) INPUT APPARATUS FOR A HANDHELD ELECTRONIC DEVICE AND METHOD OF ENABLING INPUT EMPLOYING THE SAME

(75) Inventors: Norman M. Ladouceur, Waterloo (CA); Jason T. Griffin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1001 days.

(21) Appl. No.: 11/226,003

(22) Filed: Sep. 14, 2005

(65) Prior Publication Data

US 2007/0057030 A1 Mar. 15, 2007

(51) Int. Cl.
G06F 3/02 (2006.01)
G06C 7/02 (2006.01)

(52) U.S. Cl. .................................... 345/169; 235/145 R

(58) Field of Classification Search .................. 345/156, 345/168–170; 234/145
See application file for complete search history.

(56) References Cited

U.S. PATENT DOCUMENTS

| | | | | |
|---|---|---|---|---|
| 3,611,357 A * | 10/1971 | Boulanger | ...................... | 341/22 |
| 3,909,564 A * | 9/1975 | Scheingold et al. | .......... | 200/5 E |
| 3,982,081 A * | 9/1976 | Demler, Jr. | ................... | 200/5 R |
| 4,440,515 A * | 4/1984 | Nassimbene | ................. | 400/479 |
| 5,563,630 A * | 10/1996 | Tsakiris et al. | ............... | 345/160 |
| 5,982,355 A * | 11/1999 | Jaeger et al. | ................... | 345/161 |
| 6,824,288 B2 * | 11/2004 | Prindle | ......................... | 200/314 |
| 6,861,600 B1 * | 3/2005 | Schulz et al. | ................. | 200/310 |
| 7,129,854 B2 * | 10/2006 | Arneson et al. | .......... | 340/825.69 |
| 2001/0033270 A1 * | 10/2001 | Osawa et al. | ................. | 345/168 |
| 2003/0098853 A1 | 5/2003 | Ladouceur et al. | | |

FOREIGN PATENT DOCUMENTS

EP 1 538 515 6/2005
JP 2000155640 6/2000

* cited by examiner

*Primary Examiner* — Amr Awad
*Assistant Examiner* — Jarurat Suteerawongsa
(74) *Attorney, Agent, or Firm* — Leslie A. Kinsman; Borden Ladner Gervais LLP

(57) ABSTRACT

An improved input apparatus and method of enabling input improve handheld electronic devices having a housing and a processor apparatus disposed on the housing. The processor apparatus comprises a processor and a memory. The input apparatus includes an input assembly with an input device for providing input to the processor, a plurality of input members, and at least a first actuating element movable between a first position and a second position. In the second position, the actuating element actuates the input device. Each input member of the portion of input members is movable among an unactuated position and an actuated position. Each of a plurality of input members of the portion of input members, in the actuated position, is engageable with the actuating element to move it toward the second position. The input apparatus enables close arrangement of the input members to provide, for example, a compact keyboard layout.

11 Claims, 3 Drawing Sheets

INPUT APPARATUS FOR A HANDHELD ELECTRONIC DEVICE AND METHOD OF ENABLING INPUT EMPLOYING THE SAME

BACKGROUND

1. Technical Field

The invention relates generally to handheld electronic devices and, more particularly, to an input apparatus and method of enabling input which enable, among other things, compact arrangement of the input members for the input apparatus of the handheld electronic device.

2. Background Information

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable. Thus, there is a trend to make them smaller and lighter in weight. As handheld electronic devices become smaller, the space available for the input apparatus, such as for example, a keyboard on the devices, decreases. Consequently, the size and/or configuration of the keyboard oftentimes must be revised in order to fit, which can potentially adversely affect the user friendliness of the handheld electronic device.

Advancements in technology have permitted the number of keys of the keyboard, for example, to be reduced while increasing the versatility and functionality of each key. However, such technology may require numerous keys to be actuated simultaneously in combination, or for one or more keys to be actuated in a particular sequence. This can result in the handheld electronic device undesirably becoming awkward or difficult to use. Additionally, each key of a conventional handheld electronic device keyboard typically comprises a separate input device such as a switch having, for example, a collapsible dome for providing a feedback, i.e., a tactile feedback, to the user. Not only do the components of such switches present a physical size limitation, which dictates how closely the keys of the keyboard can be configured, but simultaneous pressing of multiple keys to provide a given function can also result in the collapsing of multiple domes which can produce a confusing and/or undesirable tactile feedback to the user, and can further interfere with user friendliness.

Arranging the keys of the input apparatus in a common, well-recognized pattern is one way to enhance user friendliness. For example, the QWERTY layout of a conventional keyboard such as the keyboard of a desktop computer, allows a user to quickly and easily generate text. It is, therefore, desirable to adapt this and other user friendly key configurations for use with handheld electronic devices so that the user may, for example, generate text using the device in a traditional manner, i.e., without having to depress an extra key or combination of keys, as previously discussed. However, as noted, the physical size of the keys and the associated switch components for each key have presented a substantial obstacle to achieving this goal as handheld electronic devices are increasingly being reduced in size. Specifically, existing input device, i.e. switch, technology places physical limitations on the minimum spacing between the keys and inhibits further reduction in the size of the keyboard.

Therefore, a need exists to provide an input apparatus for a handheld electronic device which enables a compact input member configuration for the input apparatus, such as for example a compact key layout for a keyboard of the handheld electronic device. In another sense, a need also exists for a method of enabling input into the handheld electronic device employing the improved input apparatus.

SUMMARY

These needs and others are satisfied by an improved input apparatus for a handheld electronic device and a method of enabling input employing the same. The handheld electronic device may be stated to generally include a housing and a processor apparatus disposed on the housing, wherein the processor apparatus comprises a processor and a memory. The input apparatus includes an input assembly with an input device structured to provide input to the processor, a plurality of input members, and at least a first actuating element. Each input member of at least a portion of the input members is movable among an unactuated position and an actuated position. The actuating element is movable between a first position and a second position. In the second position, the actuating element actuates the input device. Each of a plurality of input members of the at least a portion of the input members, in the actuated position, is engageable with the actuating element to move it toward the second position.

Each input member may include a cam portion, and the actuating element may include a number of reaction portions wherein each cam portion of an input member in the actuated position is engageable with a corresponding reaction portion to move the actuating element toward the second position. In certain embodiments, the actuating element may be translatable between the first and second positions, while in other embodiments it may be pivotable between the first and second positions.

The input assembly of the input apparatus may further include a communications element having a plurality of electrical contacts wherein an input member in the actuated position completes a circuit that includes at least a portion of the communications element to provide input to the processor. The input may identify the input member in the actuated position. The communications element may comprise a printed circuit board enclosed by the housing.

In certain embodiments, the plurality of input members may include a first portion of input members and a second portion of input members, with the first portion of input members being cooperable with the at least a first actuating element to move the first actuating element between the first and second positions, also with the second portion of the input members being cooperable with a second actuating element movable between first and second positions. Each of a plurality of input members of the second portion of input members in the actuated position may be engageable with the second actuating element to move the second actuating element between the first and second positions. The first portion may be disposed in a first region of the input device, and the second portion may be disposed in a second region of the input device spaced from the first region.

The input device may be structured to provide a feedback, i.e. a tactile feedback, to a user when the input device is actuated. The actuating element may include a number of apertures each having an end, with a reaction portion disposed at the end. The reaction portion may be engageable with the cam portion of an input member in the actuated position. Each aperture may have a configuration, and each cam portion may have a profile wherein the configuration of an aperture of the at least a first actuating element and the profile of the cam portion of an input member in the actuated position are cooperable to move the input member in a predetermined fashion between the first and second positions.

Other aspects of the invention are provided by an improved method of enabling input into a handheld electronic device. The general nature of the method may be stated as including moving a first input member of the plurality of input members toward its actuated position and, responsive thereto, moving at least a portion of the at least a first actuating element toward the input device. The method may include actuating the input device with the at least a first actuating element and, in response, providing input to the handheld electronic device. In response to actuating the input device, a feedback, i.e. a tactile feedback, may be provided to the user. The method may further include providing an input to the handheld electronic device to identify the first input member from among the at least a portion of input members in response to moving the first input member to its actuated position. Additionally, the method may further include actuating an input member of another portion of input members of the number of input members toward its actuated position and, in response moving another actuating element toward another input device.

BRIEF DESCRIPTION OF THE DRAWINGS

A fill understanding can be gained from the following Description of the Preferred Embodiments when read in conjunction with the accompanying drawings in which.

Similar numerals refer to similar parts throughout the specification.

DESCRIPTION OF THE PREFERRED EMBODIMENTS

Figure 1:
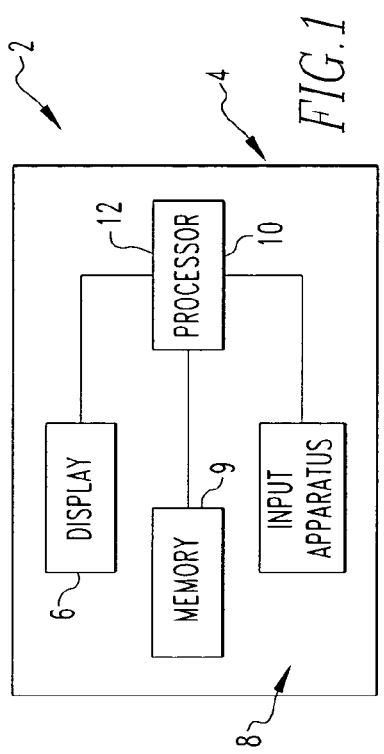
FIG. 1 is a block diagram of a handheld electronic device that includes an improved input apparatus in accordance with the invention.

For simplicity of disclosure, the inventive concept will be described and illustrated as applied to a compact key layout for a keyboard of a handheld electronic device and a method of enabling input employing the same, although it will be understood that it could also be applied to any input apparatus having a plurality of input members for enabling any type of input into any type of electronic device.

Directional phrases used herein such as, for example, top, bottom, left, right, up, down, clockwise, counterclockwise, and derivatives thereof, relate to the orientation of the elements in the drawings and are not limiting upon the claims unless expressly recited therein.

An improved handheld electronic device 2 in accordance with the inventive concept is depicted schematically in FIG. 1. The handheld electronic device 2 includes a housing 4, a display 6, an input apparatus 8 and, a processor apparatus comprising a memory 9 and a processor 10. The processor 10 may be, without limitation, a microprocessor (µP). The processor 10 has software 12 that resides in the handheld electronic device 4 and provides functionality to inputs received from the input apparatus 8 and provides outputs to the display 6. The memory 9 is cooperable with the processor 10 and may be any of a variety of internal and/or external storage media including, without limitation, RAM, ROM, EPROM, EEPROM, and/or the like. Examples of handheld electronic devices are included in U.S. Pat. Nos. 6,452,588 and 6,489,950, which are incorporated by reference herein.

Figure 2:
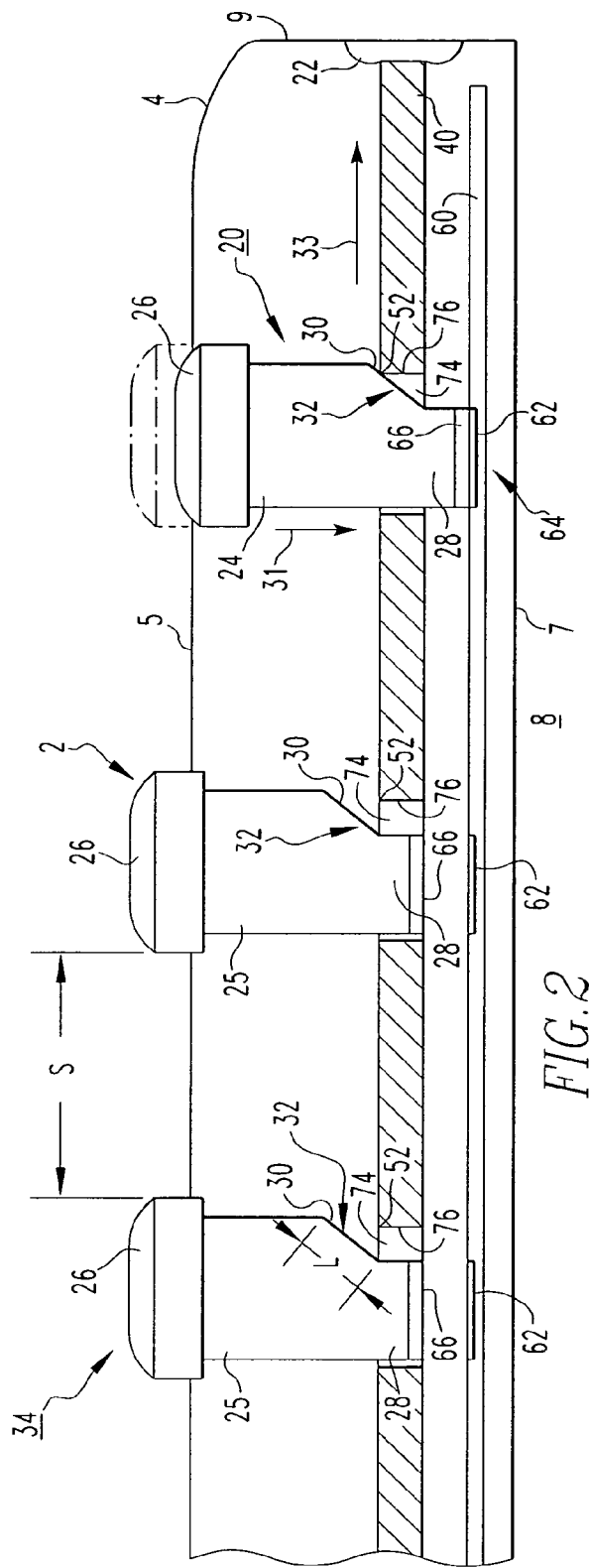
FIG. 2 is a cross-sectional end view of a portion of the handheld electronic device of FIG. 1.

FIG. 2 shows the improved input apparatus 8 in accordance with a first embodiment of the invention. The input apparatus 8 includes an input assembly 20 with an input device 22, a plurality of input members 24, 25 movable among an unactuated position and an actuated position, and at least a first actuating element 40. As will be discussed, in the example shown and described herein, the input device 22 is a tactile feedback device, such as for example, a dome switch 22, that is structured to provide tactile feedback to the user wherein the tactile feedback to the user and any input which may optionally be provided to the processor 10 are provided by separate features of the input device 22. Accordingly, a first input member 24, 25 being depressed to the actuated position can provide input to the processor 10, while movement of another input member 24, 25 can be ignored. Therefore, inputs associated, for example, with accidental actuations of additional input members 24, 25, can be ignored by the processor 10. It will be also appreciated that software 12 may be utilized to further facilitate the identification of the actuation of a first input member 24, 25 and the ability to ignore accidental inputs from other input members 24, 25.

Figure 4:
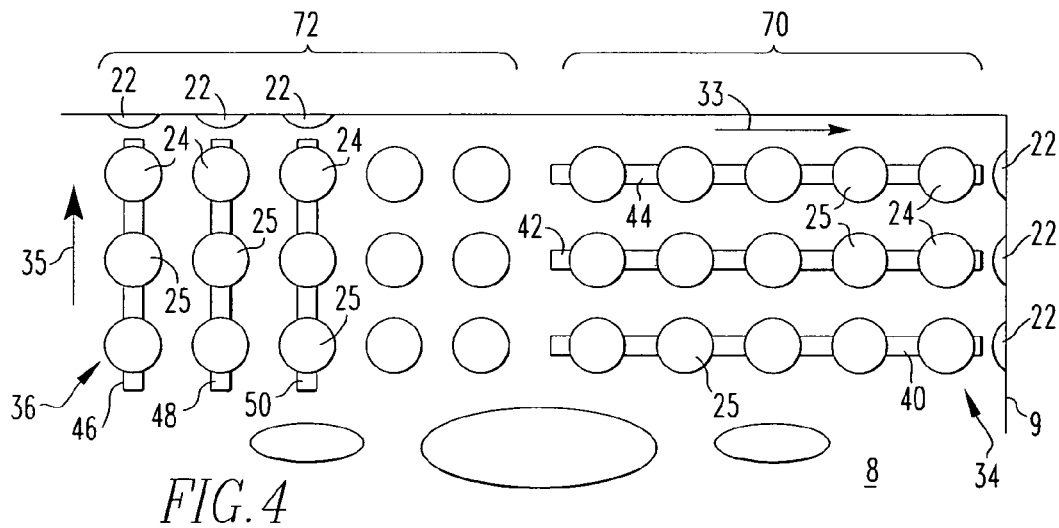
FIG. 4 is a top plan view of a keyboard input apparatus of the handheld electronic device of FIG. 1.

The actuating element 40 is movable between a first position, shown for example in FIG. 4, wherein the input device 22 is unactuated, and a second position, shown for example in FIG. 2, wherein the actuating element 40 engages and actuates the input device 22. Thus, in accordance with the invention, each of a plurality of the input members 24, 25 in the actuated position is engageable with the actuating element 40 to move it toward the second position, in the direction generally indicated by arrow 33 of FIG. 2. As an added benefit, because the plurality of input members 24, 25 are associated with one actuating element 40 and single input device, i.e. tactile dome switch 22, tactile feedback is only provided to the input member 24, 25 that has been actuated. In this manner, user confusion or interruption caused, for example, by the unintended partial depression of an adjacent input member 24, 25 due to the overlapping of that input member 24, 25 with the user's finger, is minimized because no tactile feedback is provided to the adjacent, unintentionally depressed input member 24, 25.

Figure 7:
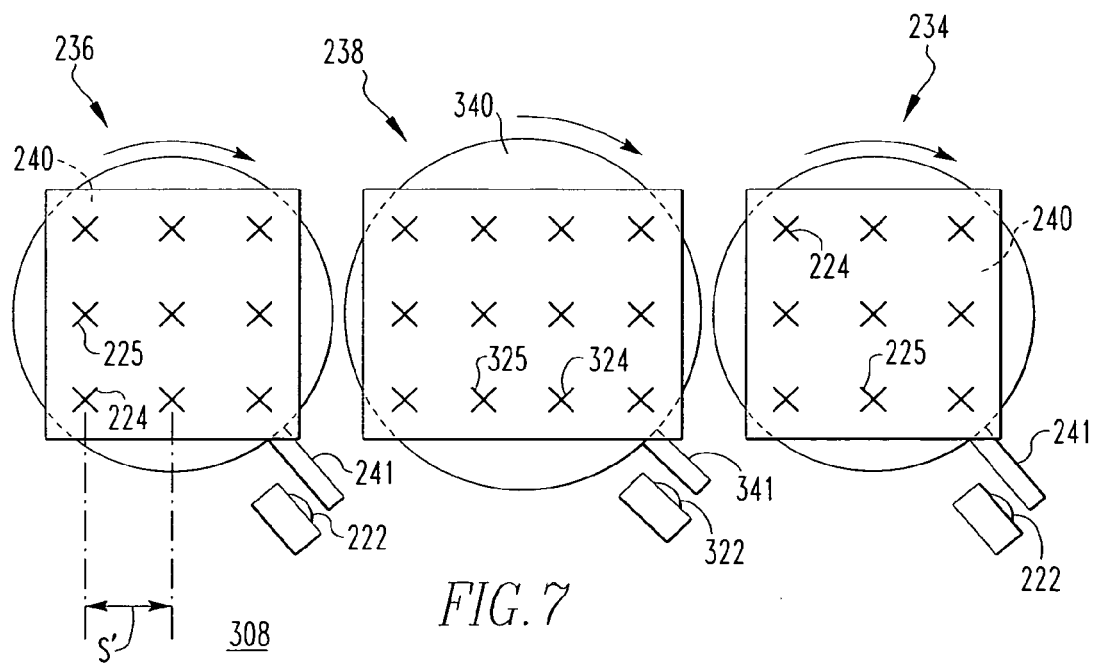
FIG. 7 is a top plan view of a keyboard of an input apparatus incorporating a QWERTY key layout.

The input apparatuses 8, 108, 208 of the examples shown and described herein comprise various keyboard input apparatuses. Non-limiting examples of keyboard input apparatuses include QWERTY keyboard layouts, as best shown in FIGS. 4 and 7, as well as any of a variety of other input member configurations such as, for example, a touch-tone telephone layout (not shown) or other layouts. It will be appreciated, however, that any suitable number of input members could be employed in any suitable configuration. As used herein, the term "input member" and variations thereof refer broadly to any of a variety of suitable input members such as, for example, without limitation, buttons, keys, switches, combinations of buttons and switches, and any other known or suitable input member, and in the exemplary embodiments herein, the input members 24, 25 are depicted as being keys. The expression "a number of" and variations thereof, as employed herein, refers broadly to one or more than one, i.e., a single or plural quantity.

For simplicity of disclosure, only three input members or keys 24, 25, which comprise a first portion 34 of the input members 24, 25 of the exemplary keyboard input apparatus 8, are shown in FIG. 2. As noted, each of the input members 24, 25 is movable to its respective actuated position to generate input to the processor apparatus. Input members 25 are shown in the unactuated positions, and input member 24 is shown in its actuated position. The input may serve as an input to a routine executed on the processor 10 such as, for example, a text generation routine. It will be appreciated, however, that as used herein, the expression "routine" refers to any type of function, process, application, task, procedure, subroutine, function call, or other type of software or firmware operation that can be executed on the handheld electronic device 2.

Continuing to refer to FIG. 2, it will be understood that each input member 24, 25 has a first end 26, which is accessible from the top 5 of the handheld electronic device 2, and a second end 28 extending into the housing 4 of the device 2 in a direction generally toward the bottom 7 (from the perspective of FIG. 2) thereof. The second ends 28 of the input members 24, 25 each include a cam portion 30. This is also true for each of the input members of the input apparatus embodiments shown and described with respect to FIGS. 4, 5, 6, and 7 although, for ease of illustration, the cam portions in those embodiments, are not shown.

The actuating element 40 includes a number of reaction portions 52 such that each cam portion 30 of an input member in the actuated position, such as input member 24 of FIG. 2, is engageable with a corresponding reaction portion 52 to move the actuating element 40 toward the second position shown. It will be appreciated that the actuating element 40 may be a substantially linear element, such as the exemplary push rod actuating elements 40, 42, 44, 46, 48, 50, 140 of the embodiments of FIGS. 2, 3, 4 and 5, which are generally translatable between the first and second positions in the directions indicated by arrows 33 of FIGS. 2, 3 and 4, arrow 35 of FIG. 4, and arrow 131 of FIG. 5. As shown in FIGS. 6 and 7, in other embodiments of the invention, the actuating element 240, 340 is a pivotable element, such as for example, a plate member which is pivotable clockwise or counterclockwise between the first and second positions. For example, the actuating element 240 of FIG. 6 is pivotable clockwise in the direction indicated by arrow 231 in order to engage the input device 222. It will also be appreciated that, as shown for example in FIG. 7, any suitable combination of two or more actuating elements of any of the push rod variety, i.e., 40, the plate member variety, i.e., 240, 340, or any other suitable type could be employed with various portions of the group of input members 24, 25, i.e., portions 34, 36 of FIG. 4 and portions 234, 236, 238 of FIG. 7, of the corresponding input apparatus 8, 208. Accordingly, because each of a plurality of input members 24, 25 all function to actuate the same actuating element 40 and thus the same input device 22, the configuration of the exemplary input apparatus, i.e., keyboard 8, may be compact since each input member 24, 25 does not require its own dome, for instance. Specifically, as previously discussed, the spacing, S, between input members 25 may be reduced in dimension, as desired since a dome associated with each key is not a size-limiting factor in the input apparatus 8. Therefore, the overall size of the handheld electronic device 2 may be reduced while maintaining a desired number of keys or input members 24, 25 in the input apparatus 8.

Continuing to refer to FIG. 2, it will be understood that the exemplary input assembly 20 further includes a communications element, such as a printed circuit board (PCB) 60. The PCB 60 includes a plurality of electrical contact 62, such that the input member 24 in the actuated position completes a circuit that includes at least a portion of the PCB 60, to provide input to the processor 10. Such input may, for example, identify which input member 24 among the portion of input members 34 has been actuated. More specifically, three sets of electrical contacts 62 are shown in FIG. 2. Each set of contacts 62 includes a pair of contacts electrically engageable with a conductor 66 disposed on end 28 of the input member 24 when it is actuated in the direction generally indicated by arrow 32 of FIG. 2. A substantially similar PCB and electrical contact configuration is described in greater detail in U.S. patent application Ser. No. 10/785,633 filed Feb. 24, 2004, which is hereby incorporated herein by reference. The exemplary sets of electrical contacts 62 are aligned with the corresponding conductor 66, i.e., a carbon pill, disposed on end 28 of the input member 24, and are generally of an intermeshed comb arrangement as described in U.S. patent application Ser. No. 10/785,633. The exemplary input device 22, which is a collapsible dome 22 comprising a ball contact and a ring contact extending concentrically about the ball contact, is also described and illustrated in U.S. patent application Ser. No. 10/785,633.

In the exemplary embodiment of the PCB 60 shown and described herein, the PCB 60 provides a separate input to the processor 10 in addition to that from the input devices 22, 122. It will be appreciated, however, that certain of the input devices, i.e., dome contacts 22, 122 of FIGS. 2, 4 and 5, could alternatively be electrically connected with leads, as shown and described in U.S. patent application Ser. No. 10/785,633, to certain of the electrical contacts 62. It will be appreciated, however, that a wide variety of other contact configurations (not shown) could be employed without departing from the concept of the invention. It will also be appreciated that, while the exemplary electrical contact 62 are contemplated as being metallic traces, any known or suitable contact material such as, without limitation, cooper traces or gold traces, in any suitable configuration, could be employed. The same is true with regard to the exemplary carbon pills 66. Additionally, any other known or suitable input device, other than the aforementioned collapsible domes 22, could be employed in any suitable number and configuration other than those shown and described herein.

More specifically, the exemplary domes 22 are elastically deflectable between an undeflected position shown in FIG. 4, and a deflected position of FIG. 2. The movement of the domes 22 between the undeflected and deflected positions occurs via elastic deformation of the domes 22 and causes the domes 22 to "snap" between the undeflected and deflected positions to provide a desirable tactile feedback to the user in response to the actuation of the input member 24 to its actuated position. It will be understood that the domes 22 could be adhered or otherwise connected to the housing 4 or any other suitable stationary structure, in any known or suitable manner, for example, by way of a suitable adhesive. Alternatively, the domes 22 need not be adhered, for example, in embodiments where the domes 22 float in an enclosed space.

Figure 3:
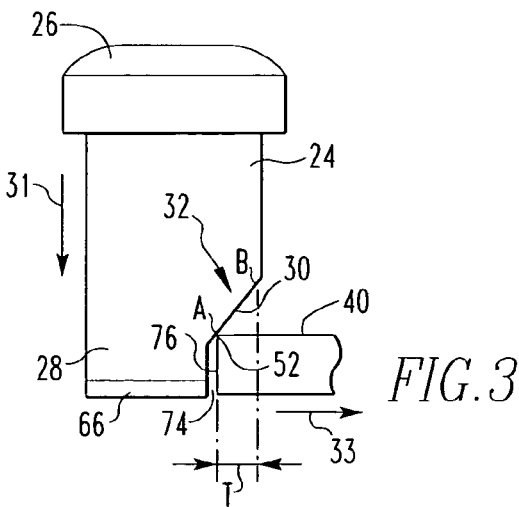
FIG. 3 is a side view of a portion of the input apparatus of FIG. 2.

As shown in FIG. 3, and as previously discussed, each input member 24 includes a cam portion 30. In addition to having a length, L, as shown in FIG. 2, the cam portion also has a profile 32. The exemplary profile 32 of cam 30 is an angled linear profile, although any known or suitable alternative profile could be employed. For example, without limitation, the angle of the linear profile 32 of FIG. 3 could be increased or decreased with respect to the actuating element 40, while in other embodiments an entirely different profile, such as a curved or arcuate profile (not shown), could be employed. Accordingly, it will be understood that the profile 32 of the cam portion 30 at least partially defines the characteristics of the movement of the actuating element 40 between the first and second positions thereof. More specifically, in the example of FIG. 3, the profile 32 of cam portion 30 results in a movement of the actuating element 40 a distance, T, in the direction indicated by arrow 33, when the cam portion 30 engages reaction portion 52 of the actuating element 40 and the region of contact therebetween slides from point A to point B as the input member 24 is moved toward the actuated position in the direction indicated by arrow 31. In this manner, actuation of the input member 24 toward its actuated position moves the actuating element 40 toward its second position with the characteristic of such movement being defined, in part, by the cam portion profile 32.

FIG. 4 shows an embodiment of the invention in which the input apparatus 8 comprises a keyboard having a QWERTY key or input member configuration. In the example of FIG. 4, the plurality of input members 24, 25 are arranged in a first portion 34 and a second portion 36. The first portion of input members 34 is cooperable with actuating elements 40, 42, 44. More specifically, the first portion 34 comprises three rows of input members 24, 25. Each row includes five input members 24, 25 each of which is cooperable with a corresponding actuating element 40, 42, 44 and an associated input device, i.e., dome 22. In operation, movement of any one of the input members 24, 25 in a particular row to its actuated position, moves the corresponding actuating element 40, 42, 44 in the direction indicated by arrow 33, toward the associated dome 22. In this manner, the invention not only enables input to the handheld electronic device 2 using a reduced number of input devices, i.e., domes 22, but more importantly, it allows the space between input members, 24, 25, i.e., space S between input members 24 of FIG. 2 and space S' between input members 224 of FIG. 7, to be less than would be technically possible using a separate input device, i.e., dome 22, for each input member 24, 25. Thus, the overall size required for the input apparatus 8 can also be reduced. The example of FIG. 4 includes second portion 36 with at least three additional actuating elements 46, 48, 50, each being movable from the first position shown, upward in the direction indicated by arrow 35, toward the associated dome 22. Accordingly, portion 36 of FIG. 4 illustrates how two different configurations of actuating elements can be employed in different regions 70, 72 of the input apparatus 8. Specifically, actuating elements 46, 48, 50 of portion 36 are disposed in a first orientation and associated with columns of input members 24, 25 each having three input members 24, 25, as opposed to the second, different orientation of the rows of input members 24, 25 of the portion 34 of region 70 of the input apparatus 8. Thus, by associating a plurality of input members 24, 25 with a single dome 22, a consistent feedback, i.e., tactile feedback, is provided to the user even though the configuration or layout of the input members is condensed. It will be appreciated that the example of FIG. 4 is but one example among a wide variety of input apparatus configurations contemplated by the invention.

Figure 5:
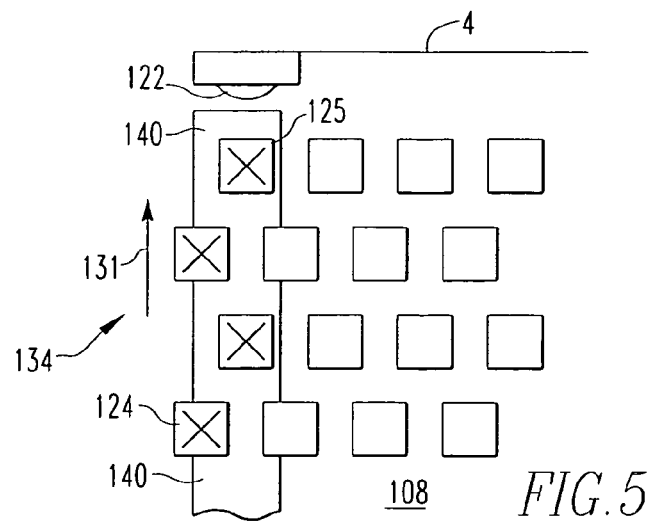
FIG. 5 is a top plan view of a portion of another input apparatus.
Figure 6:
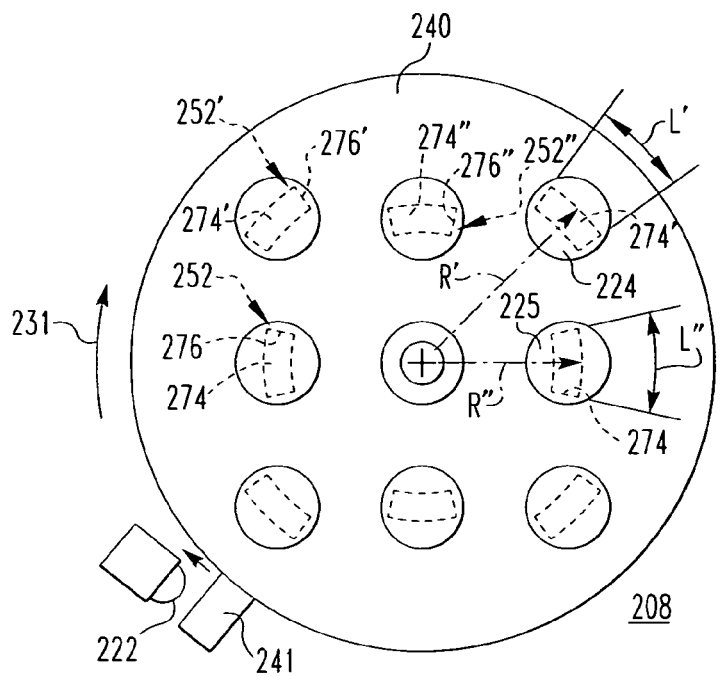
FIG. 6 is a top plan view of a portion of another input apparatus.

For example, FIG. 5 illustrates another embodiment in which the input members or keys 124, 125 are arranged in a different configuration, and the actuating element 140 is cooperable with a different portion 134 of the input members 124, 125. Specifically, in the example of FIG. 5, four offset keys 124, 125 are cooperable with a single actuating element 140. In operation, enabling input into the handheld electronic device using the input apparatus 108 would involve actuating any one of the four keys, i.e., key 124, to its actuated position, which would result in movement of the actuating element 140 from the first position shown, in the direction indicated by arrow 131 toward input device 122.

FIG. 6 shows another embodiment of the input apparatus 208 in accordance with the invention in which the actuating element 240 is pivotable. The cam portions of the input elements 224, 225 are not shown in the plan view of FIG. 6. However, it will be appreciated that such cam portions are substantially similar in configuration and operation to those previously discussed in connection with FIGS. 2 and 3. More specifically, in operation, actuation of a first input member 224 to its actuated position results in the cam portion (not shown) engaging a corresponding reaction portion 252 of the actuating element 240. In response, the actuating element 240 pivots clockwise in the direction generally indicated by arrow 231 toward the input device 222. In the example of FIG. 6, the pivotable actuating element 240 includes a protrusion or tab 241 which is structured to engage the exemplary dome switch input device 222 when the first input member 224 is actuated to its actuated position.

In the example of FIG. 6, the actuating element 240 includes a number of apertures 274, 274', 274". Each aperture 274, 274', 274" has an end 276, 276', 276", with the reaction portion 252, 252', 252" being disposed at the end 276, 276', 276" (see also reaction portion 52 disposed at end 76 of aperture 74 in FIGS. 2 and 3). As previously discussed, the reaction portions 252, 252', 252" are engageable with the cam portion (not shown in FIG. 6) of a corresponding input member 224 when the input member 224 is in the actuated position. Each aperture 274, 274', 274" has a size and a shape. In addition to the aforementioned profile 32 (FIGS. 2 and 3) of cam portion 30 (FIGS. 2 and 3), the size and shape of the apertures 274, 274', 274" further define how the actuating element 240 moves between the first and second positions. For example, without limitation, the apertures 274, 274', 274" of FIG. 6 are three different sizes, respectively. Additionally, while each aperture 274, 274', 274" is generally arcuate in shape, the length of each aperture 274, 274', 274" differs depending on the radial location of the aperture 274, 274', 274" on the actuating element 240. Accordingly, the desired actuating element movement is defined by the interaction of the aforementioned cam portion of an actuated input member 224 in the actuated position with the corresponding aperture 274, 274', 274" and, more specifically, with the reaction portion 252, 252', 252" of the aperture 274, 274', 274".

As shown in FIG. 6, each input member 224, 225 and the corresponding aperture 274, 274', 274" is spaced at a distance, R', R", from the center of the exemplary pivotable actuating element 240. In order to provide substantially the same clockwise rotation of the actuating element 240 regardless of which input member 224, 225 is actuated, the aperture 274, 274', 274" associated with the input member 224, 225 must have the appropriate size and shape, as shown. For example, input member 224 and associated aperture 274' are disposed on the actuating element 240 a distance R' from the center of the actuating element 240 which is farther from the center than, for example, input member 225 and associated aperture 274, which are disposed at a distance R". Accordingly, in order to achieve the same rotational movement of the actuating element 240 upon actuation of the associated input member 224, 225 to its actuated position, aperture 274' has a length L', which is longer than the length, L" of aperture 274. Additionally, the aforementioned cam profiles 32, shown in FIGS. 2 and 3, will be different at different locations. More specifically, the input members 224, 225 each move the same distance or are depressed the same amount to their respective actuated positions. Therefore, to cause the actuating element 240 to pivot the correct distance regardless of which input member 224, 225 is actuated requires the profile 32 of the cam 30, shown in FIGS. 2 and 3, and, in particular the slope of the profile 32, to be appropriately configured for the particular position of the aperture 274, 274', 274" on the actuating element 240. For example the cam profile for input member 224 of FIG. 6, which is disposed the greater radial distance of R' from the center of the actuating element 240 than distance R" of input member 225, will require a profile that is not as steep which is longer, than the steeper, shorter profile of input member 225. The exact shape and dimension of the apertures 274, 274', 274" is not meant to be a limiting aspect of the invention. It will be appreciated that any known or suitable alternative configuration of apertures could be employed other than those shown and described in the examples herein. For example, referring briefly back to FIG. 2, the apertures 74 in actuating element 40 are generally rectangular in shape. It will still further be appreciated that in other embodiments of the invention no apertures are required. For example, alternatively, the actuating element could have a shaped profile (not shown) which includes the reaction portions and functions similarly to the profile 32 of cam portion 30 previously discussed, in order to define movement of the actuating element between its first and second positions.

FIG. 7 shows an embodiment where the input apparatus is a keyboard 308 having a QWERTY key layout with three spaced apart portions 234, 236, 238 of input members or keys 224, 225, 324, 325. Each portion 234, 236, 238 has a corresponding actuating element 240, 340 which can be actuated by any one of the keys 224, 225, 324, 325 of that portion 234, 236, 238. In the example of FIG. 7, each actuating element 240, 340 is a pivotable actuating element having a protrusion or tab 241, 341 for engaging the associated input device 222, 322, although it will be appreciated that any known or suitable alternative combination of actuating elements in any known or suitable configuration could alternatively be employed. For simplicity of illustration, the keys 224, 225, 324, 325 are each represented by a X. The first and second portions 234, 236 of keys 224, 225 each have nine keys 224, 225 and a single pivotable actuating element 240. The third portion 238 is larger, having 12 keys 324, 325 and being disposed in between the first and second portions 234, 236. The third portion 238 also has a single pivotable actuating element 340. Accordingly, the invention, in accordance with the embodiment of FIG. 7, enables the entire keyboard input apparatus 308 to employ only three actuating elements 240, 340 while retaining all of the keys and functionality of a conventional QWERTY keyboard key layout. As such, it will be understood that the spacing between keys, S', can be substantially reduced and the overall key layout can be made more compact.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An input apparatus for a handheld electronic device, the handheld electronic device including a housing and a processor apparatus disposed on the housing, the processor apparatus comprising a processor and a memory, the input apparatus comprising:
   a plurality of input members, each input member being movable between an unactuated position and an actuated position;
   a single tactile feedback device associated with the plurality of input members to provide a tactile feedback to a user; and
   a single actuating element movable between a first position and a second position by movement of one of the plurality of input members to the actuated position, each of the plurality of input members including a cam portion; and the single actuating element including a number of apertures each having an end, and a number of reaction portions, the reaction portions being disposed at the ends, each reaction portion configured to engage the cam portion of a corresponding input member in the actuated position, a first input member in the actuated position moving the actuating element to the second position thereby directly actuating the tactile feedback device, completing a circuit to provide a first input to the processor, causing the processor to ignore inputs from a second input member in the actuated position while the first input member is in the actuated position, and preventing actuation of the tactile feedback device by the second input member in the actuated position while the first member is in the actuated position.

2. The input apparatus of claim 1 wherein the single actuating element is translatable between the first and second positions.

3. The input apparatus of claim 1 wherein the single actuating element is pivotable between the first and second positions.

4. The input apparatus of claim 1 further comprising a communication element including a plurality of electrical contacts; and wherein the first input member in the actuated position completes the circuit that includes at least a portion of the communication element to provide the first input to the processor.

5. The input apparatus of claim 4 wherein the first input identifies the first input member in the actuated position.

6. The input apparatus of claim 4 wherein the communication element comprises a printed circuit board enclosed by the housing.

7. The input apparatus of claim 4 wherein each of the plurality of input members includes a conductor at one end, the conductor configured to electrically engage a pair of the plurality of electrical contacts to complete the circuit.

8. The input apparatus of claim 1 further comprising a second plurality of input members being movable between the unactuated position and the actuated position, and a second actuating element associated with the second plurality of input members, wherein each of the second plurality of input members in the actuated position is configured to engage the second actuating element to move the second actuating element between first and second positions to actuate a second tactile feedback device.

9. The input apparatus of claim 8 wherein the plurality of input members is disposed in a first region of the input apparatus, and the second plurality of input members is disposed in a second region of the input apparatus spaced from the first region.

10. The input apparatus of claim 1 wherein each aperture of the number of apertures has a configuration; wherein each cam portion has a profile; and wherein the configuration of an aperture of the single actuating element and the profile of the cam portion of an input member in the actuated position are configured to cooperate to move the input member in a predetermined fashion between the first and second positions.

11. The input apparatus of claim 1 wherein the single actuating element is selected from a group consisting of a push rod, a plate member, and a combination of at least one push rod and at least one plate member.

* * * * *